UNITED STATES PATENT OFFICE.

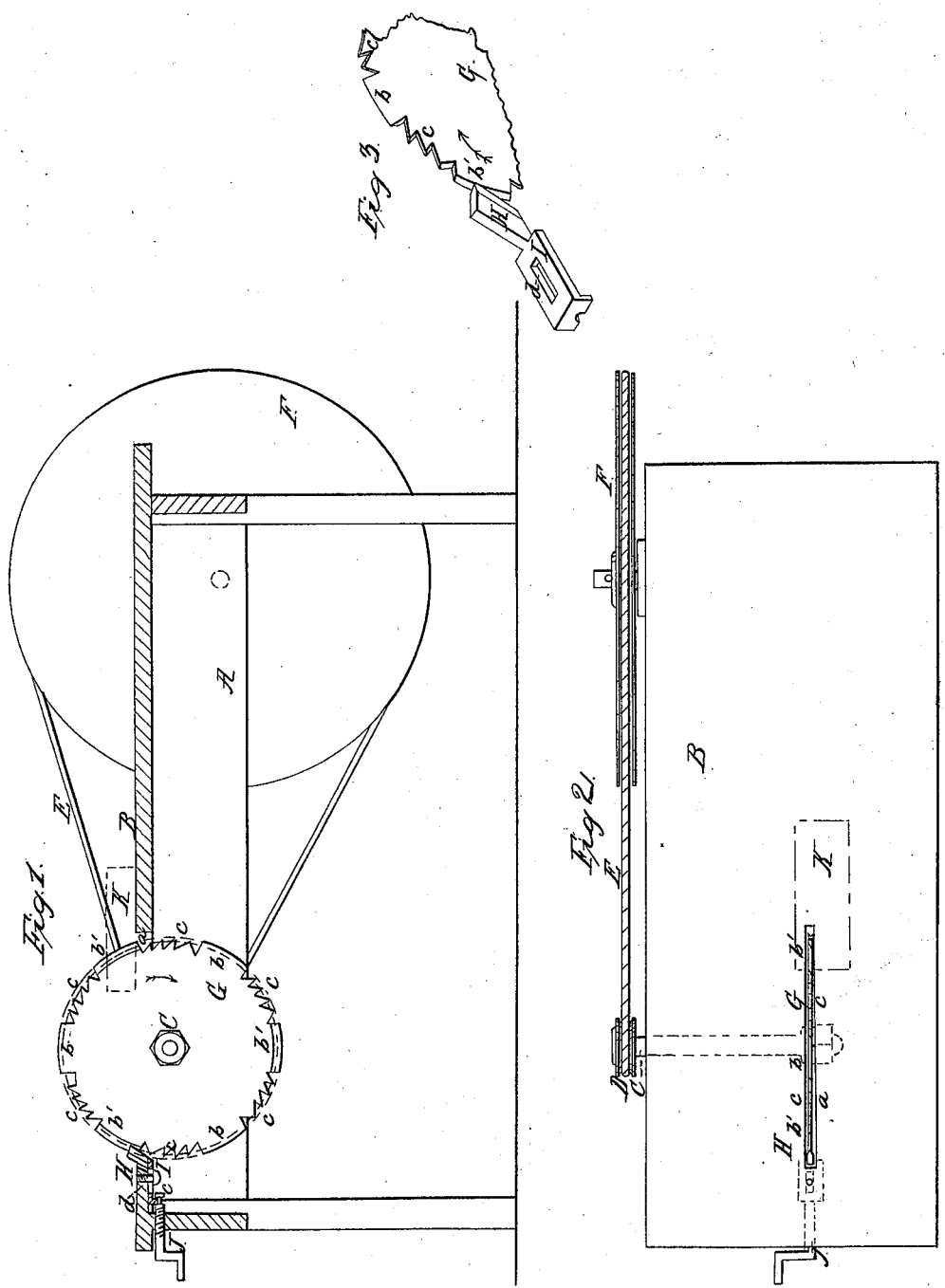

EDWARD CONROY, OF BOSTON, MASSACHUSETTS.

SHARPENING DEVICE FOR ROTARY CUTTERS.

Specification of Letters Patent No. 19,982, dated April 20, 1858.

*To all whom it may concern:*

Be it known that I, EDWARD CONROY, of Boston, in the county of Suffolk and State of Massachusetts, have invented a new and Improved Machine for Cutting Cork; and I do hereby declare that the following is a full, clear, and exact description of the same, reference being had to the annexed drawings, making a part of this specification, in which—

Figure 1, is a longitudinal vertical section of a framing or table on which my improvement is mounted and showing a side view of the same. Fig. 2, is a plan or top view of ditto. Fig. 3, is a detached perspective view of a portion of the cutter and the sharpening device.

Similar letters of reference indicated corresponding parts in the several figures.

This invention consists in a new arrangement or application of a sharpening device to a rotating cutter.

The form of the cutter, it will be understood, constitutes no part of my invention.

To enable those skilled in the art to fully understand and construct my invention I will proceed to describe it.

A, represents a table or rectangular framing having a platform B, on its upper end, and C, is a shaft or arbor which is placed transversely on the upper part of the framing underneath the platform B, said shaft or arbor having a pulley D, on its outer end, around which a belt E, passes, said belt also passing around a driving pulley F, attached to the framing. To the inner end of the shaft or arbor C, a circular cutter G, is attached. This cutter projects upward through a slot ($a$) in the platform B.

The cutter G is formed of a circular steel plate of any proper diameter provided at its edge or periphery with teeth ($b$), ($b^1$), and teeth ($c$). The teeth ($b$) ($b^1$) are formed by beveling the edges of the plate at one side, the teeth ($b$)) having their bezel at the right and the teeth ($b^1$) having their bezel at the left side of the plate, the cutting edges of the teeth ($b$), ($b^1$), being perfect segments or parts of the plate. Six of these teeth ($b$) ($b^1$) are formed alternately on the plate at equal distances apart and the spaces between the teeth ($b$) ($b^1$) are toothed, said teeth ($c$) being of the usual saw-tooth form, having but little or no set. The points of the teeth ($c$) do not project outward quite so far as the edges of the teeth ($b$), ($b^1$), but their points should terminate in a circle concentric with the circle which the edges of the teeth ($b$) ($b^1$) touch, see Fig. 1, in which the two circles are shown by dotted lines.

In the outer end of the slot ($a$) and in the same plane with the cutter G, a stone or steel bar H, is placed. This stone or bar serves as a sharpening device, and it may be formed of ordinary whet or grinding stone, or it may be formed of a piece of steel, cut or corrugated so as to act as a file. The bar H, is slightly inclined, its upper end being nearer the saw than its lower end, and the front edge of the bar is formed by two bezels as shown clearly in Figs. 2 and 3, the bezels of the bar corresponding with the bezels of the teeth ($b$) ($b^1$) that is to say, the bezel at the right side of the bar H, corresponds with or is in the same plane with the bezel of the teeth ($b$), while the bezel at the opposite side of the bar is in the same plane with the bezel of the teeth ($b^1$).

The bar H, is attached at the lower end to a plate I, which is secured to the underside of the platform B, by a screw ($c^1$) which passes through an oblong slot ($d$) in the plate I, is consequently allowed to slide and is adjusted or operated by a screw J, which is fitted in the end of the framing and has its inner end connected with the plate I, so that by turning the screw J, the bar H, may be adjusted nearer to or farther from the cutter G. This will be clearly understood by referring to Fig. 1.

The operation is as follows:—The pulley F, is rotated in any proper manner and the cutter G is rotated in the direction indicated by the arrow. The cork K, to be cut is placed on the platform B, and fed or pressed toward the cutter G. The teeth ($b$), ($b^1$), cut a V-shaped shaving as the cork is fed toward the cutter G, and this shaving is removed by the saw teeth ($c$). The teeth ($b$), ($b^1$), are kept perfectly sharp, for as the cutter rotates the bezels of the teeth ($b$) pass over one bezel of the bar H, and the teeth ($b^1$) pass over the other bezel of the bar, the bar H, being so adjusted as to bear sufficiently hard against the teeth ($b$) ($b^1$). The teeth ($b$), ($b^1$), are thereby always kept in perfect working order and the cork will be smoothly cut.

The difficulty attending the cutting of cork is, that the cork generally has more or less grit or sand attached to its outer surface and this grit or sand destroys the edge of the cutting tool, which should be very sharp in order to cut cork smoothly. By my improvement this difficulty is obviated.

I do not claim, broadly, the idea of rendering revolving cutters self-sharpening by bringing their edges into contact with a sharpening instrument; but

Having thus described my invention what I claim as new and desire to secure by Letters Patent, is—

The sharpening device H, when arranged and employed substantially in the manner herein shown and described.

EDWARD CONROY.

Witnesses:
H. MONTGOMERY,
JOHN BUTLER.